United States Patent
Kojima et al.

(10) Patent No.: US 12,115,514 B2
(45) Date of Patent: Oct. 15, 2024

(54) ADSORBENT FOR REMOVING CARBONYL SULFIDE CONTAINED IN A STREAM CONTAINING AN OLEFIN

(71) Applicant: JGC CATALYSTS AND CHEMICALS LTD., Kawasaki (JP)

(72) Inventors: Chihiro Kojima, Kitakyushu (JP); Shingo Sakai, Kitakyushu (JP); Takahiro Yashima, Kitakyushu (JP); Kaoru Takahashi, Niigata (JP); Atsushi Okita, Ibaraki-gun (JP); Kazunori Honda, Ibaraki-gun (JP)

(73) Assignee: JGC CATALYSTS AND CHEMICALS LTD., Kawasaki (JP)

( * ) Notice: Subject to any disclaimer, the term of this patent is extended or adjusted under 35 U.S.C. 154(b) by 221 days.

(21) Appl. No.: 17/041,010

(22) PCT Filed: Mar. 28, 2019

(86) PCT No.: PCT/JP2019/013524
§ 371 (c)(1),
(2) Date: Sep. 24, 2020

(87) PCT Pub. No.: WO2019/189550
PCT Pub. Date: Oct. 3, 2019

(65) Prior Publication Data
US 2021/0138430 A1    May 13, 2021

(30) Foreign Application Priority Data
Mar. 29, 2018 (JP) ................. 2018-065854

(51) Int. Cl.
*B01J 20/08*  (2006.01)
*B01J 20/30*  (2006.01)
*B01J 20/32*  (2006.01)

(52) U.S. Cl.
CPC .......... *B01J 20/08* (2013.01); *B01J 20/3007* (2013.01); *B01J 20/3021* (2013.01); *B01J 20/3042* (2013.01); *B01J 20/3078* (2013.01); *B01J 20/3204* (2013.01); *B01J 2220/42* (2013.01)

(58) Field of Classification Search
CPC .... B01J 20/08; B01J 20/3021; B01J 20/3042; B01J 20/3433; B01J 20/3078; B01J 20/3204; B01J 2219/00918; B01J 2219/00921; B01J 20/0237
See application file for complete search history.

(56) References Cited

U.S. PATENT DOCUMENTS

| | | | | |
|---|---|---|---|---|
| 7,749,376 B2 * | 7/2010 | Turbevillle | ............. | B01J 23/80 |
| | | | | 208/299 |
| 7,780,846 B2 * | 8/2010 | Weston | ............. | B01J 20/06 |
| | | | | 208/213 |
| 10,112,170 B2 * | 10/2018 | Reddy | ............. | B01J 20/3204 |
| 2007/0131589 A1 | 6/2007 | Weston et al. | | |
| 2009/0155148 A1 | 6/2009 | Kanazirev | | |
| 2012/0000825 A1 | 1/2012 | Kanazirev et al. | | |
| 2017/0080400 A1 | 3/2017 | Reddy et al. | | |
| 2018/0016210 A1 | 1/2018 | Beuckels et al. | | |
| 2018/0029023 A1 * | 2/2018 | Koseoglu | ............. | C07C 7/1485 |
| 2018/0161753 A1 * | 6/2018 | Evans | ............. | B01J 20/3293 |

FOREIGN PATENT DOCUMENTS

| | | | |
|---|---|---|---|
| CN | 101429460 | A | 5/2009 |
| EP | 3 632 535 | A1 | 4/2020 |
| JP | H02-276891 | A | 11/1990 |
| JP | H03213115 | A * | 9/1991 |
| JP | H05-70375 | A | 3/1993 |
| JP | H05-70376 | A | 3/1993 |
| JP | H05-293366 | A | 11/1993 |
| JP | H06-1805 | A | 1/1994 |
| JP | H09-510141 | A | 10/1997 |
| JP | 2003-290659 | A | 10/2003 |
| JP | 2004-305869 | A | 11/2004 |
| JP | 2005-068337 | A | 3/2005 |
| JP | 2008-524377 | A | 7/2008 |
| JP | 2012-206944 | A | 10/2012 |
| JP | 2018-118225 | A | 8/2018 |
| WO | 2017/083116 | A1 | 5/2017 |
| WO | 2018/221633 | A1 | 12/2018 |

OTHER PUBLICATIONS

Gholami et al. International Journal of Hydrogen Energy, 2016, 41, 15141-15148 (Year: 2016).*
Turbeville et al. Catalysis Today 2006, 116, 519-525 (Year: 2006).*
Obara et al. JPH03213115A English Translation (Year: 1991).*
Sep. 29, 2020 International Preliminary Report on Patentability issued in International Patent Application No. PCT/JP2019/013524.
Chaudhuri, S. et al., "Removal of Carbonyl Sulfide From a Liquid Hydrocarbon With Activated Alumina," Sep. Technol., vol. 2., Apr. 1992, pp. 58-61.
Nov. 30, 2021 extended Search Report issued in European Patent Application No. 19775722.2.
Oct. 26, 2022 Office Action issued in Chinese Patent Application No. 201980021306.6.
Apr. 3, 2023 Office Action issued in Indian Patent Application No. 202017043086.

(Continued)

*Primary Examiner* — Samir Shah
*Assistant Examiner* — Jordan W Taylor
(74) *Attorney, Agent, or Firm* — Oliff PLC

(57) ABSTRACT

An adsorbent of the invention, which is an adsorbent for removing carbonyl sulfide in a stream containing an olefin, contains copper oxide and an aluminum compound, in which a content of the aluminum compound ranges from 10 mass % to 50 mass % in terms of Al, and an $NH_3$ desorption in a temperature region ranging from 100 degrees C. to 200 degrees C. as measured by $NH_3$-TPD measurement is more than 0.001 mmol/g and 1 mmol/g or less.

10 Claims, No Drawings

(56) References Cited

OTHER PUBLICATIONS

New Century Catalytic Science and Technology, Proceedings of the 10th National Conference on Catalysis, Shaxi Science Technology Publisher, p. 393 (2000).
May 10, 2023 Office Action issued in Chinese Patent Application No. 201980021306.6.
Zhao et al., "Mesoporous alumina molecular sieves; characterization and catalytic activity in hydrolysis of carbon disulfide," Catalysis Letters, vol. 89, Nos. 1-2, Jul. 2003, pp. 41-47.
"New Materials and Technology of Fine Chemicals," First Edition, China Petrochemical Press Co., Ltd., p. 526, Apr. 30, 1998.
"Research on Aluminum Oxide," Science and Technology Agency, National Institute For Research in Inorganic Materials, No. 21, pp. 1 and 6, Jun. 1, 1973.
Jan. 28, 2020 Office Action issued in Japanese Patent Application No. 2019-554939.
Jun. 18, 2019 International Search Report issued in International Patent Application No. PCT/JP2019/013524.

\* cited by examiner

ADSORBENT FOR REMOVING CARBONYL SULFIDE CONTAINED IN A STREAM CONTAINING AN OLEFIN

TECHNICAL FIELD

The present invention relates to an adsorbent for removing carbonyl sulfide.

BACKGROUND ART

Carbonyl sulfide (chemical formula: COS), which is a kind of sulfur compound, is a poisonous compound to various catalysts. For instance, it is known that propylene, whose demand has been recently growing, contains minute amounts of impurities including carbonyl sulfide. When the propylene is subjected to a polymerization process without being purified, the carbonyl sulfide poisons a propylene polymerization catalyst (Patent Literature 1).

In order to remove the impurities, for instance, a distillation method for separating a target compound and impurities using a difference in boiling points has been industrially used. However, it is also known that, due to the proximity of the boiling points of propylene and carbonyl sulfide, the carbonyl sulfide contained in propylene is difficult to be completely removed by the distillation method. It is also known that, in the same manner as propylene, the carbonyl sulfide, which is contained in hydrocarbons having 2 to 6 carbon atoms with boiling points proximate to carbonyl sulfide, is difficult to be completely separated by the distillation method (Patent Literature 2).

Examples of known methods for removing carbonyl sulfide, which is difficult to be separated by the distillation method, include a method for removing carbonyl sulfide by bringing carbonyl sulfide into contact with an adsorbent, a method for removing carbonyl sulfide by bringing carbonyl sulfide into contact with an absorbing liquid, and a method for removing carbonyl sulfide through hydrolysis.

For instance, Patent Literature 3 discloses a method for bringing a stream containing carbonyl sulfide into contact with an adsorbent including an alumina carrier and lead oxide or the like carried thereon, thereby removing carbonyl sulfide. At this time, carbonyl sulfide is in contact with the lead oxide contained in the adsorbent to be removed.

Patent Literature 4 discloses an absorbent (adsorbent) for a sulfur compound containing at least one copper compound selected from copper carbonate, basic copper carbonate, copper hydroxide, and a composite thereof. Patent Literature 4 also discloses a method, in which, when the sulfur compound is carbonyl sulfide, carbonyl sulfide is hydrolyzed by γ alumina used as a carrier to generate hydrogen sulfide, the hydrogen sulfide being removed by basic copper carbonate.

Patent Literature 5 discloses that alumina is usable as a catalyst for hydrolyzing carbonyl sulfide and alumina may be acidic. However, Patent Literature 5 also discloses that, when the catalyst is used in a hydrocarbon stream containing an olefin and a sulfur compound, undesirable polymerization side reaction is promoted. It is also disclosed that the use of an alkali such as sodium oxide and potassium oxide as a dopant minimizes the side reaction. The hydrolysis catalyst containing alumina added with the alkali is also disclosed in, for instance, Patent Literature 6.

CITATION LIST

Patent Literature(s)

Patent Literature 1 JP 2012-206944 A
Patent Literature 2 JP 5-070375 A
Patent Literature 3 JP 5-293366 A
Patent Literature 4 JP 9-510141 A
Patent Literature 5 JP 2008-524377 A
Patent Literature 6 JP 2-276891 A

SUMMARY OF THE INVENTION

Problem(s) to be Solved by the Invention

A removal rate for carbonyl sulfide of the adsorbent, which removes carbonyl sulfide after hydrolyzing carbonyl sulfide as disclosed in Patent Literature 4, is greatly affected by the hydrolysis reaction activity of carbonyl sulfide. In view of the above, an object of the invention is to provide an adsorbent containing a component excellent in hydrolysis reaction activity for carbonyl sulfide.

Means for Solving the Problem(s)

As a result of examination of hydrolysis reaction activity of various substances for carbonyl sulfide, the inventors have found that the use of a weakly acidic aluminum compound enhances the above hydrolysis reaction activity. The invention has been made based on the inventors' finding that the adsorbent containing the aluminum compound and copper oxide can efficiently remove carbonyl sulfide in a stream containing an olefin (sometimes referred to as "olefin-containing stream" hereinafter).

An adsorbent according to an aspect of the invention, which is an adsorbent for removing carbonyl sulfide in a stream containing an olefin, contains copper oxide and an aluminum compound, in which a content of the aluminum compound ranges from 10 mass % to 50 mass % in terms of Al, and an $NH_3$ desorption in a temperature region ranging from 100 degrees C. to 200 degrees C. as measured by a temperature-programmed desorption of ammonia (sometimes referred to as "$NH_3$-TPD measurement" hereinafter) is more than 0.001 mmol/g and 1 mmol/g or less.

Advantage of the Invention

According to the invention, an adsorbent containing a component excellent in hydrolysis reaction activity for carbonyl sulfide can be provided.

DESCRIPTION OF EMBODIMENT(S)

The invention will be specifically described below with reference to exemplary embodiment(s).
Adsorbent of the Invention An adsorbent of the invention, which is an adsorbent for removing carbonyl sulfide in a stream containing an olefin, contains copper oxide, and an aluminum compound, in which a content of the aluminum compound ranges from 10 mass % to 50 mass % in terms of Al, and an amount of $NH_3$ desorption in a temperature region ranging from 100 degrees C. to 200 degrees C. as measured by $NH_3$-TPD measurement is more than 0.001 mmol/g and 1 mmol/g or less.

The adsorbent of the invention, which contains a component for hydrolyzing carbonyl sulfide into hydrogen sulfide and a component for adsorbing hydrogen sulfide, is weakly acidic. The adsorbent of the invention is weakly acidic because the component in the adsorbent for hydrolyzing carbonyl sulfide into hydrogen sulfide is weakly acidic. For instance, the adsorbent contains a weakly acidic aluminum compound. The adsorbent of the invention contains copper oxide as the component for adsorbing hydrogen sulfide. It should be noted that copper oxide is also an adsorbent for carbonyl sulfide. Adsorption of hydrogen sulfide by copper oxide is faster in speed than adsorption of carbonyl sulfide by copper oxide. Accordingly, an adsorbent containing both of copper oxide and the component for hydrolyzing carbonyl sulfide exhibits higher removal rate of carbonyl sulfide than that of an adsorbent, which contains copper oxide but does not contain the component for hydrolyzing carbonyl sulfide.

The adsorbent of the invention, which contains the weakly acidic compound, is weakly acidic. In the invention, as an index for representing the weak acidity, the amount of $NH_3$ desorption in a temperature region ranging from 100 degrees C. to 200 degrees C. as calculated based on the results of the $NH_3$-TPD measurement is used. The $NH_3$-TPD measurement is a method for evaluating a solid acidity of a substance, in which $NH_3$ (basic compound) is adsorbed at an acid point of the substance and then the amount of $NH_3$ desorbed by heating the substance is measured. With the use of this method, the acid amount of the substance can be calculated based on the amount of $NH_3$ desorption. Further, it is known that the desorption temperature of $NH_3$ varies in accordance with the acid strength, where, for instance, at a low acid strength, the interaction of $NH_3$ with the acid point becomes small to lower the desorption temperature of $NH_3$. In the invention, the weak acidity of the aluminum compound contained in the adsorbent is defined with the use of the above evaluation method. The adsorbent of the invention exhibits the amount of $NH_3$ desorption in a range of more than 0.001 mmol/g and 1 mmol/g or less in a temperature region ranging from 100 degrees C. to 200 degrees C. as calculated based on the $NH_3$-TPD measurement. When the $NH_3$ desorption is 0.001 mmol/g or less, the hydrolysis activity and removal rate for carbonyl sulfide are undesirably lowered. The $NH_3$ desorption may be in a range from 0.005 mmol/g to 0.1 mmol/g, or in a range from 0.005 mmol/g to 0.05 mmol/g. It is easily conceivable that the adsorbent of the invention exhibits higher hydrolysis reaction activity for carbonyl sulfide as the $NH_3$ desorption increases. However, even with the relatively small $NH_3$ desorption as defined by the above-mentioned range, the adsorbent shows a high hydrolysis reaction activity and high removal rate.

The weakly acidic compound contained in the adsorbent of the invention is preferably not alumina carrying an alkali as disclosed in Patent Literatures 5 and 6 but is preferably a weakly acidic aluminum compound.

The reason why the weakly acidic aluminum compound is effective for hydrolysis reaction of carbonyl sulfide, which is not clearly known, is speculated by the inventors as follows. Specifically, the following explanation can be given based on the fact that the acid point is positively charged and carbonyl sulfide, which is constructed as O═C═S, is a polar molecule with unevenly negatively charged O atom due to a difference between electronegativity of O atom and S atom. Initially, it is speculated that the negatively charged O atom, which is included in carbonyl sulfide and is adsorbed at the positively charged acid point, reacts with a surface OH group present on the surface of the aluminum compound to promote the hydrolysis reaction. Further, it is speculated that water molecule, which is also a polar molecule similarly to carbonyl sulfide and is adsorbed at the acid point, also reacts with carbonyl sulfide to promote the hydrolysis reaction. It should be noted that, when an adsorbent containing highly acidic aluminum compound is used in an olefin-containing stream, the adsorbent is sometimes covered with a polymer generated by polymerization of the olefin. In this case, the adsorption amount of carbonyl sulfide and removal rate are lowered. In contrast, the adsorbent containing the weakly acidic aluminum compound, which is weak in acid strength, is believed to be less likely to cause such a reaction even when being used in an olefin-containing stream.

It is preferable that the aluminum compound contained in the adsorbent of the invention exhibits $NH_3$ desorption in a range from 0.01 mmol/g to 10 mmol/g in a temperature region ranging from 100 degrees C. to 200 degrees C. as calculated based on the $NH_3$-TPD measurement. The adsorbent containing the weakly acidic aluminum compound exhibits high hydrolysis activity and removal rate for carbonyl sulfide. The $NH_3$ desorption of the aluminum compound contained in the adsorbent of the invention may be in a range from 0.01 mmol/g to 1 mmol/g, or in a range from 0.01 mmol/g to 0.05 mmol/g. It is easily conceivable that the adsorbent of the invention exhibits higher hydrolysis reaction activity for carbonyl sulfide as the $NH_3$ desorption increases. However, even with the relatively small $NH_3$ desorption as defined by the above-mentioned range, the adsorbent shows a high hydrolysis reaction activity.

The aluminum compound contained in the adsorbent of the invention is preferably aluminum hydroxide, aluminum oxide (alumina) or a composite thereof. When aluminum hydroxide is contained, the crystal structure of the aluminum hydroxide is preferably pseudo-boehmite. It should be noted that the crystal structure of aluminum hydroxide can be determined based on an X-ray diffraction pattern. However, due to the proximity of the crystal structures of boehmite and pseudo-boehmite, it is difficult to clearly distinguish boehmite and pseudo-boehmite based on the X-ray diffraction pattern. However, it is known that the X-ray diffraction pattern of pseudo-boehmite becomes broad as compared with boehmite. Accordingly, it is determined in the invention that the aluminum compound has a pseudo-boehmite structure when a half-value width (full width at half maximum) of a peak attributable to (020) face derived from the crystal structure of boehmite is 1.0° or more. When aluminum oxide is contained, aluminum oxide more preferably has at least one crystal structure selected from $\chi$ (chi), $\rho$ (rho), and $\theta$ (theta), especially preferably chi. It should be noted that the crystal structure of aluminum oxide can be determined based on an X-ray diffraction pattern.

The content (sometimes referred to as Al content, hereinafter) of the aluminum compound contained in the adsorbent of the invention is in a range from 10 mass % to 50 mass % in terms of Al. Excessive content of the aluminum compound results in relative decrease in the content of copper oxide and consequent failure in fully removing hydrogen sulfide generated by the hydrolysis of carbonyl sulfide. Meanwhile, excessively small content of the aluminum compound inhibits hydrolysis of carbonyl sulfide and, consequently, reduces the removal rate of carbonyl sulfide by the adsorbent. The content of the aluminum compound is preferably in a range from 10 mass % to 30 mass % in order to accelerate the removal rate of carbonyl sulfide.

The content of alkali in the adsorbent of the invention is preferably less than 0.5 mass % in terms of metal, especially preferably less than 0.1 mass % in terms of metal. The adsorbent of the invention includes a plurality of weakly acidic acid points, which are sometimes deactivated upon adsorption of alkali. Accordingly the alkali content of the adsorbent of the invention is preferably as small as possible.

Contents of transition metal components other than copper in the adsorbent of the invention are each preferably less than 1 mass % in terms of metal, especially preferably less than 0.1 mass % in terms of metal. There are various catalysts for the hydrolysis of carbonyl sulfide that contain transition metal components (e.g. Cr and Zn) carried on the aluminum compound. However, the adsorbent of the invention is capable of hydrolyzing carbonyl sulfide at a high removal rate with extremely small or no content of the transition metal.

The adsorbent of the invention contains copper oxide. The copper oxide contained in the adsorbent of the invention is, as described above, a component for removing hydrogen sulfide generated by the hydrolysis of carbonyl sulfide. Water, which is generated when hydrogen sulfide is brought into contact with copper oxide to be removed ($CuO+H_2S \rightarrow CuS+H_2O$), can be reused for the hydrolysis reaction of carbonyl sulfide. It should be noted that copper oxide contained in the adsorbent of the invention can be determined based on an X-ray diffraction pattern. A half-value width (full width at half maximum) of a diffraction peak in a range of $2\theta=37$ to $40°$ attributable to copper oxide contained in the adsorbent of the invention is preferably in a range from 0.8 to $2°$. The adsorbent containing copper oxide, whose half-value width is within the above range, is likely to exhibit accelerated removal rate of carbonyl sulfide.

The content (sometimes referred to as Cu content, hereinafter) of copper oxide contained in the adsorbent of the invention is preferably in a range from 5 mass % to 50 mass % in terms of Cu, more preferably in a range from 30 mass % to 50 mass % in terms of Cu. When the content of copper oxide is excessively small, hydrogen sulfide generated by hydrolyzing carbonyl sulfide cannot be fully removed but are eluted. The elution of hydrogen sulfide, which is a poisonous compound for various catalysts, is undesirable. When the content of copper oxide is excessively large, the content of the aluminum compound is relatively decreased, so that carbonyl sulfide cannot be efficiently hydrolyzed and the removal rate of carbonyl sulfide tends to be reduced.

In the adsorbent of the invention, a molar ratio (Cu/Al) of copper to aluminum is preferably in a range from 0.1 to 2, more preferably in a range of 0.5 or more and less than 1. At the molar ratio within the above range, the hydrolysis of carbonyl sulfide and removal of hydrolyzed hydrogen sulfide are well-balanced, resulting in increase in the removal rate of carbonyl sulfide.

The adsorbent of the invention can be used under the condition that a specific surface area of the adsorbent is less than 200 $m^2/g$. In general, an adsorbent, on a surface of which adsorbs adsorbed species, is required to have a large specific surface area. However, the adsorbent of the invention, which is configured to remove carbonyl sulfide after the hydrolysis reaction, can efficiently remove the carbonyl sulfide even when having a specific surface area not so high as a typical adsorbent. The specific surface area may be in a range of 100 $m^2/g$ or more and less than 200 $m^2/g$. When the specific surface area is less than 100 $m^2/g$, the adsorption amount of carbonyl sulfide to the adsorbent may be sometimes undesirably reduced.

The adsorbent of the invention may have any known shape, which specifically may be, for instance, spherical, columnar, or the like. Further, the size of the adsorbent (minimum dimension of the adsorbent) preferably ranges from 0.5 mm to 6 mm. When the size of the adsorbent is excessively large, the contact area between the adsorbent and olefin is decreased, which sometimes undesirably results in decrease in the removal rate of carbonyl sulfide. Meanwhile, excessively small size of the adsorbent results in increase in pressure loss when the olefin-containing stream flows through the adsorbent, possibly blocking the flow of the stream.

The adsorbent of the invention is usable as an adsorbent for removing carbonyl sulfide contained in an olefin-containing stream. The adsorbent of the invention is suitably usable as an adsorbent for removing carbonyl sulfide contained in a stream containing an olefin having 2 to 6 carbon atoms, especially suitable usable as an adsorbent for removing carbonyl sulfide in a stream containing propylene. Further, the adsorbent of the invention can efficiently remove carbonyl sulfide even in a stream containing a liquid olefin that is not easily dispersible into an inside of the adsorbent.

The adsorbent of the invention is suitably usable in a process in which a concentration of carbonyl sulfide contained in the olefin-containing stream is in a range from 0.01 ppm to 30 ppm. Further, the adsorbent of the invention, which can hydrolyze carbonyl sulfide with use of a surface OH group or the like of the aluminum compound contained in the adsorbent of the invention, can efficiently remove carbonyl sulfide even in a process using small amount of water with respect to carbonyl sulfide. More specifically, carbonyl sulfide can be efficiently removed even in a process whose molar ratio ($H_2O$/COS) of water to carbonyl sulfide contained in the olefin-containing stream is less than 1. It should be noted that the water, which is generated when hydrogen sulfide generated by the hydrolysis of carbonyl sulfide is removed by being in contact with copper oxide, is re-used for the hydrolysis reaction of carbonyl sulfide.

The adsorbent of the invention can remove carbonyl sulfide in a process in which a temperature of the olefin-containing stream is in a range from $-10$ degrees C. to 70 degrees C. When the temperature of the olefin-containing stream is excessively low, carbonyl sulfide cannot be efficiently hydrolyzed and the removal rate of carbonyl sulfide tends to be reduced. Meanwhile, when the temperature of the olefin-containing stream is excessively high, polymerization of olefin can easily occur. Accordingly, the adsorbent is preferably used in the above-described temperature range.

Manufacturing Method of Adsorbent of the Invention

The adsorbent of the invention can be manufactured by, for instance, a below-described manufacturing method of the adsorbent of the invention.

A manufacturing method of the adsorbent of the invention, which is configured to remove carbonyl sulfide contained in an olefin-containing stream, includes: mixing an aluminum compound and copper oxide so that a content of the aluminum compound is in a range from 10 mass % to 50 mass % in terms of Al, the aluminum compound exhibiting an $NH_3$ desorption in a range from 0.01 mmol/g to 10 mmol/g in a temperature region ranging from 100 degrees C. to 200 degrees C. as calculated based on a temperature-programmed desorption of ammonia.

It is known that acidity of an aluminum compound varies depending on a crystal structure of the aluminum compound, impurities (e.g. Si and alkali), a manufacturing method and the like. The aluminum compound contained in the adsorbent of the invention can be obtained, for instance, by a surface-treatment of conventionally known aluminum compound with a weak acid. It should be noted that the acidity on the surface of the aluminum compound surface-treated with a weak acid changes when the aluminum compound is calcined. Accordingly, the aluminum compound is preferably used without being calcined. Specifically, it is preferable that the aluminum compound is not calcined at a temperature of 300 degrees C. or more. Alternatively, among the aluminum compounds sold as an industrial material, an aluminum compound, which exhibits the $NH_3$ desorption in a range from 0.01 mmol/g to 10 mmol/g in a temperature region ranging from 100 degrees C. to 200 degrees C. as calculated based on the $NH_3$-TPD measurement, may be obtained for use. It should be noted that a weakly acidic component other than the aluminum compound may be added.

The copper oxide may be obtained by calcining a copper compound, or may be synthesized in an aqueous solution. The copper oxide is obtained by calcining a copper compound such as copper acetate, basic copper carbonate, and copper nitrate at a temperature ranging from 300 degrees C. to 500 degrees C. The copper oxide synthesized in an aqueous solution can be obtained by heating copper hydroxide dispersed in an aqueous solution to 50 degrees C. or more.

In the invention, the above-described aluminum compound and copper oxide may be mixed and subsequently molded into a desired shape. For instance, the mixture may be pulverized into a desired shape after being compression molded or the mixture may be molded into a desired shape by tableting, extrusion or the like. At this time, a molding aid or the like may be added in order to enhance moldability. It should be noted that the above-described aluminum compound and copper oxide is preferably not calcined after being mixed. When the mixture is calcined, a by-product such as $CuAl_2O_4$ may be generated or the acidity of the aluminum compound may be thermally affected to be changed.

EXAMPLE(S)

The invention will be described in more detail below with reference to Examples and Comparatives. However, the scope of the invention is by no means limited by these Examples and Comparatives.

A method for preparing copper oxide used in Examples and Comparatives of the invention are as follows.
Preparation Method of Copper Oxide 231 g sodium hydroxide was dissolved in 5.8 kg ion exchange water to prepare a mother liquid. Then, 676 g copper sulfate pentahydrate was dissolved in 2.6 kg ion exchange water to prepare an additive liquid. The mother liquid and additive liquid were each heated and then blended to produce a precipitate of copper oxide. A slurry containing the precipitate of copper oxide was filtrated to separate the precipitate of copper oxide, which was then sufficiently washed to obtain a precipitate cake of copper oxide. The precipitate cake was dispersed in 4.0 kg ion exchange water to prepare a copper oxide slurry. The copper oxide slurry was dried to prepare powdery copper oxide.

Example 1

Commercially available aluminum oxide (manufactured by UOP LLC, product name: VERSAL R-3) and the above-described copper oxide were physically mixed at a mass ratio of 1:1. The mixture was set in a tableting machine and was pressed at a pressure of 60 MPa for one minute. The resultant moldings were pulverized into particles, which were then classified using 355-μm mesh and 710-μm mesh sieves to obtain particles whose diameter ranged from 355 to 710 μm. The particles were used as an adsorbent A. The information on the material (type of aluminum compound and alkali content) and the information on the adsorbent (Cu content, Al content, and alkali content of adsorbent, and molar ratio (Cu/Al) of copper to aluminum in the adsorbent) are also shown in Table 1.

($NH_3$-TPD Measurement: $NH_3$ Desorption in Temperature Region from 100 Degrees C. to 200 Degrees C.)

$NH_3$-TPD measurement was performed on the aluminum compound used in Example 1 and the adsorbent obtained by the method of Example 1. Specifically, 0.05 g sample of the above-described aluminum compound was weighed and was set in a sample tube of an $NH_3$-TPD measuring machine (manufactured by Microtrac Bell Co. Ltd., machine name: BEL-CAT A) (in measuring the sample of the adsorbent, 0.1 g sample was weighed). Subsequently, while inert gas (He) was fed in the sample tube at a flow rate of 30 ml/min, the sample was heated at 150 degrees C. for 60 minutes. Then, while the temperature in the sample tube was kept at 100 degrees C., a gas containing $NH_3$ ($NH_3$: 5%, He: balance) was fed for 60 minutes to have the sample adsorb $NH_3$. Thereafter, the flow of the inert gas in the sample tube at a flow rate of 30 ml/min was kept for 60 minutes. Subsequently, while the temperature was kept at 100 degrees C. and the flow rate of the inert gas was kept at 30 ml/min, water vapor was introduced into the sample tube for 30 minutes to remove the physically adsorbed $NH_3$. The introduction of water vapor was then stopped and the temperature in the sample tube and the flow rate of the inert gas were kept at 100 degrees C. and 30 ml/min, respectively, for 30 minutes. Then, the temperature was raised to 70 degrees C. at a temperature rise rate of 10 degrees C./m in and was kept for 10 minutes. At this time, $NH_3$ desorbed from the sample was measured using a quadrupole mass spectrometer (Q-Mass). Based on the data obtained through the measurement, the amount of $NH_3$ desorbed while the temperature in the sample tube was in a range from 100 degrees C. to 200 degrees C. was calculated, which was then divided by a charged amount of the sample to calculate the $NH_3$ desorption in the temperature region in a range from 100 degrees C. to 200 degrees C. The results are shown in Table 1.

X-Ray Diffraction Measurement: Crystal Structure of Aluminum Compound

X-ray diffraction measurement was performed on the aluminum compound and the adsorbent used in Example 1. Specifically, a sample plate, which was filled with the sample, was set in an X-ray diffractometer (manufactured by Rigaku Corporation, machine name: MultiFlex). Subsequently, the X-ray diffraction measurement was conducted under the following conditions.

Conditions for X-Ray Diffraction Measurement
  Operation Axis: 2θ/θ
  X-ray source: CuKα
  Measurement method: Continuous
  Voltage: 40 kV
  Current: 20 mA
  Start angle: 2θ=10°
  End angle: 2θ=80°
  Sampling width: 0.020°
  Scan speed: 4.000°/min As a result of analysis of an X-ray diffraction pattern obtained by the X-ray diffraction measurement by an accessory analysis software of the X-ray diffractometer, the crystal structure was identified as described in Table 1.
Measurement of Specific Surface Area The resultant adsorbent, which was pretreated while nitrogen was flowing, was set in a full-automatic specific surface area measurement machine (manufactured by MOUNTECH Co. Ltd., model: Macsorb HM model-1220) and the specific surface area was calculated by nitrogen-adsorption method (BET method: single point BET) based on a desorption amount of nitrogen. Specifically, 0.1 g sample, which was separated and filled in a measurement cell and was pretreated in the flow of nitrogen at 250 degrees C. for 40 minutes, was kept at a temperature of liquid nitrogen in a nitrogen mixture gas (nitrogen 30%, helium 70% in volume fraction) to have nitrogen be equilibrium-adsorbed to the sample. Then, the temperature of the sample was gradually raised to a room temperature while the above mixture gas was kept flowing, and the amount of desorbed nitrogen during the temperature rise was detected using a thermal conductivity detector. Finally, 1 milliliter/pulse pure nitrogen was fed and the specific surface area was calculated based on a ratio to the above amount of nitrogen desorption.

Hydrolysis Reaction Activity Test of Carbonyl Sulfide

The aluminum compound used in Example 1 was evaluated in terms of hydrolysis reaction activity for carbonyl sulfide. Specifically, the adsorbent A (particle size: 355 to 710 μm) as a sample, which was filled at a height of 1.5 cm in a reaction tube with 0.53-cm inner diameter, was heated at 150 degrees C. for an hour while nitrogen was fed. Subsequently, while the temperature of the sample was kept at 22 degrees C., a material liquid (COS: 10 mass ppm, 1-hexene: balance) was fed at a supply rate of 3.2 g/min. Input and output liquids of the reaction tube were sampled at every predetermined time, and COS concentration and $H_2S$ concentration of the input and output liquids after starting the flow of the material liquid were measured using a gas chromatograph (manufactured by Agilent Technologies, machine name: 7890B GC) provided with a chemical luminescence sulfur detector (SCD detector). Inversion rate of COS was calculated based on the results of the measurement by a formula (1) below. The results are shown in Table 1.

$$\text{COS inversion rate } [\%] = \text{output } H_2S \text{ concentration}/\text{input COS concentration} \times 100 \quad \text{Formula (1):}$$

Removal Rate Test of Carbonyl Sulfide

The adsorbent obtained in Example 1 was evaluated in terms of removal rate for carbonyl sulfide. Specific procedures for the evaluation were the same as those in the evaluation of the hydrolysis reaction activity for carbonyl sulfide except that the adsorbent was set in the reaction tube so that the height of the adsorbent was 8 cm. A constant for COS removal rate was calculated based on a difference between COS concentrations at the input and output of the reaction tube after an elapse of 90 minutes after starting the flow of the material liquid. The results are shown in Table 1.

Example 2

An adsorbent B was prepared in the same manner as in preparing the adsorbent A except for the use of commercially available aluminum hydroxide (manufactured by UOP LLC, product name: V-250). The same measurement as in Example 1 was performed. The results are shown in Table 1. The information on the material and adsorbent is also shown in Table 1.

Example 3

An adsorbent C was prepared in the same manner as in preparing the adsorbent A except for the use of commercially available aluminum hydroxide (manufactured by Nippon Light Metal Co., Ltd., product name: C10W). The same measurement as in Example 1 was performed. The results are shown in Table 1. The information on the material and adsorbent is also shown in Table 1.

Example 4

Commercially available aluminum oxide (manufactured by UOP LLC, product name: V-250) and the above-described copper oxide were physically mixed at a mass ratio of 9:1. Then, the mixture was set in a tableting machine to apply a pressure of 60 MPa for one minute for pressing. The resultant moldings were pulverized into particles, which were then classified using 355-μm mesh and 710-μm mesh sieves to obtain particles whose diameter ranged from 355 to 710 μm. The particles were used as an adsorbent D. The same measurement as in Example 1 was performed. The results are shown in Table 1. The information on the material and adsorbent is also shown in Table 1.

Example 5

An adsorbent E was prepared in the same manner as in preparing the adsorbent D except for the use of commercially available aluminum hydroxide (manufactured by Nippon Light Metal Co., Ltd., product name: C10W). The same measurement as in Example 1 was performed. The results are shown in Table 1. The information on the material and adsorbent is also shown in Table 1.

Example 6

An adsorbent F was prepared in the same manner as in preparing the adsorbent D except for the use of commercially available aluminum oxide (manufactured by UOP LLC, product name: VERSAL R-3). The same measurement as in Example 1 was performed. The results are shown in Table 1. The information on the material and adsorbent is also shown in Table 1.

Example 7

200 g copper oxide used in Example 1, a carrier in a form of commercially available χ (chi)-alumina (specific surface area: 210 m$^2$/g), an organic binder of 8 g, an inorganic binder in a form of silica sol of 100 g (Si concentration: 20 mass % (in terms of $SiO_2$)), and 125 g ion exchange water were charged in a mixer to be uniformly blended to prepare a material mixture.

The material mixture was charged in an extruder to be extruded into a form of cylindrical moldings of 1.6-mm diameter and a height ranging from 3 to 5 mm. The moldings were dried by an electric drier at a temperature of 120 degrees C. for 16 hours to obtain a sulfur-compound adsorbent. The resultant sulfur-compound adsorbent was pulverized into particles, which were then classified using 355-μm mesh and 710-μm mesh sieves to obtain particles whose diameter ranged from 355 to 710 μm. The particles were used as an adsorbent G. The same measurement as in Example 1 was performed. The results are shown in Table 1. The information on the material and adsorbent is also shown in Table 1.

Comparative 1

Commercially available aluminum hydroxide (manufactured by Showa Denko K.K., product name: H-32) and the above-described copper oxide were physically mixed at a mass ratio of 1:9. Then, the mixture was set in a tableting machine to apply a pressure of 60 MPa for one minute for pressing. The resultant moldings were pulverized into particles, which were then classified using 355-μm mesh and 710-μm mesh sieves to obtain particles whose diameter ranged from 355 to 710 μm. The particles were used as an adsorbent H. The same measurement as in Example 1 was performed. The results are shown in Table 1. The information on the material and adsorbent is also shown in Table 1.

Comparative 2

An adsorbent I was prepared in the same manner as in preparing the adsorbent G except for the use of commercially available aluminum hydroxide (manufactured by Nippon Light Metal Co., Ltd., product name: C10W). The same measurement as in Example 1 was performed. The results are shown in Table 1. The information on the material and adsorbent are also shown in Table 1.

Comparative 3

An adsorbent J was prepared in the same manner as in preparing the adsorbent G except for the use of commercially available aluminum hydroxide (manufactured by UOP LLC, product name: V-250). The same measurement as in Example 1 was performed. The results are shown in Table 1. The information on the material and adsorbent are also shown in Table 1.

Comparative 4

An adsorbent K was prepared in the same manner as in preparing the adsorbent G except for the use of commercially available aluminum oxide (manufactured by UOP LLC, product name: VERSAL R-3). The same measurement as in Example 1 was performed. The results are shown in Table 1. The information on the material and adsorbent is also shown in Table 1.

Comparative 5

An adsorbent L was prepared in the same manner as in preparing the adsorbent A except for the use of commercially available aluminum hydroxide (manufactured by Showa Denko K.K., product name: H-32). The same measurement as in Example 1 was performed. The results are shown in Table 1. The information on the material and adsorbent is also shown in Table 1.

TABLE 1

| | | Material (aluminum compound) | | | | | Adsorbent | |
|---|---|---|---|---|---|---|---|---|
| | Adsorbent | Type | Crystal structure | $NH_3$ desorption (25 to 200° C.) [mmol/g] | Alkali content (mass %) | COS inevrsion rate [%] | Cu content [mass %] | Al content [mass %] |
| Example 1 | A | aluminum oxide | Chi | 0.0155 | 0.24 | 43 | 40 | 26 |
| Example 2 | B | aluminum hydroxide | pseudo-boehmite | 0.0110 | 0.00 | 42 | 40 | 22 |
| Example 3 | C | aluminum hydroxide | pseudo-boehmite Bayerite | 0.0150 | 0.01 | 48 | 40 | 22 |
| Example 4 | D | aluminum hydroxide | pseudo-boehmite | 0.0110 | 0.00 | 42 | 8 | 40 |
| Example 5 | E | aluminum hydroxide | pseudo-boehmite Bayerite | 0.0150 | 0.01 | 48 | 8 | 40 |
| Example 6 | F | aluminum oxide | Chi | 0.0155 | 0.24 | 43 | 8 | 48 |
| Example 7 | G | aluminum oxide | Chi | 0.0155 | 0.24 | 43 | 37 | 28 |
| Comparative 1 | H | aluminum hydroxide | gibbsite | 0.0004 | 0.15 | 0 | 72 | 3 |
| Comparative 2 | I | aluminum hydroxide | pseudo-boehmite Bayerite | 0.0150 | 0.01 | 48 | 72 | 4 |
| Comparative 3 | J | aluminum hydroxide | pseudo-boehmite | 0.0110 | 0.00 | 42 | 72 | 4 |
| Comparative 4 | K | aluminum oxide | Chi | 0.0155 | 0.24 | 43 | 72 | 5 |
| Comparative 5 | L | aluminum hydroxide | gibbsite | 0.0004 | 0.15 | 0 | 40 | 17 |

| | Adsorbent | | | | |
|---|---|---|---|---|---|
| | Cu/Al [mol/mol] | Alkali content (mass %) | Specific surface area ($m^2$/g) | $NH_3$ desorption (100 to 200° C.) [mmol/g] | COS removal rate constant [$sec^{-1}$] |
| Example 1 | 0.65 | 0.12 | 132 | 0.008 | 0.25 |
| Example 2 | 0.77 | 0.00 | 134 | 0.005 | 0.27 |
| Example 3 | 0.77 | 0.00 | 135 | 0.007 | 0.27 |
| Example 4 | 0.08 | 0.00 | 196 | 0.010 | 0.20 |
| Example 5 | 0.08 | 0.01 | 198 | 0.008 | 0.22 |
| Example 6 | 0.07 | 0.22 | 196 | 0.014 | 0.24 |
| Example 7 | 0.56 | 0.13 | 181 | 0.008 | 0.26 |
| Comparative 1 | 10.19 | 0.01 | 71 | 0.000 | 0.04 |
| Comparative 2 | 7.64 | 0.00 | 73 | 0.001 | 0.10 |
| Comparative 3 | 7.64 | 0.00 | 72 | 0.001 | 0.10 |
| Comparative 4 | 6.11 | 0.02 | 72 | 0.001 | 0.10 |
| Comparative 5 | 1.00 | 0.07 | 136 | 0.000 | 0.03 |

As is clear from the results shown in Table 1, adsorbents (Examples 1 to 7) whose $NH_3$ desorption is more than 0.001 mmol/g and 1 mmol/g or less show significantly increased COS removal rate as compared with adsorbents of Comparatives 1 to 5 whose $NH_3$ desorption is 0.001 mmol/g or less.

The invention claimed is:

1. An adsorbent for removing carbonyl sulfide contained in a stream containing an olefin, the adsorbent comprising:
   copper oxide; and
   an aluminum compound, wherein
   the aluminum compound is at least one selected from aluminum hydroxide and aluminum oxide, wherein a crystal structure of the aluminum hydroxide is pseudo-boehmite and a crystal structure of the aluminum oxide is at least one crystal structure selected from the group consisting of $\chi$ and $\rho$,
   a content of the aluminum compound is in a range from 10 mass % to 50 mass % in terms of Al,
   a molar ratio (Cu/Al) of copper to aluminum is in a range from 0.5 to less than 1,
   the adsorbent has an $NH_3$ desorption as calculated based on a temperature-programmed desorption of ammonia in a temperature region ranging from 100 degrees C. to 200 degrees C. in a range from more than 0.001 mmol/g to 1 mmol/g or less, and
   the adsorbent comprises less than 1 mass % of a component containing a transition metal other than copper.

2. The adsorbent according to claim 1, wherein the aluminum compound has an $NH_3$ desorption in a range from 0.01 mmol/g to 10 mmol/g as calculated based on a temperature-programmed desorption of ammonia in the temperature region ranging from 100 degrees C. to 200 degrees C.

3. The adsorbent according to claim 1, wherein a specific surface area of the adsorbent is less than 200 $m^2/g$.

4. The adsorbent according to claim 1, wherein a content of the copper oxide is in a range from 5 mass % to 50 mass % in terms of Cu.

5. The adsorbent according to claim 1, wherein a content of alkali is less than 0.5 mass %.

6. The adsorbent according to claim 1, wherein the aluminum compound is aluminum oxide having a crystal structure of $\chi$.

7. The adsorbent according to claim 1, wherein the adsorbent comprises less than 0.1 mass % of a component containing a transition metal other than copper.

8. A method of manufacturing an adsorbent for removing carbonyl sulfide contained in a stream containing an olefin, the method comprising:
   mixing an aluminum compound and copper oxide so that a content of the aluminum compound is in a range from 10 mass % to 50 mass % in terms of Al and a molar ratio (Cu/Al) of copper to aluminum is in a range from 0.5 to less than 1, the aluminum compound exhibiting an $NH_3$ desorption in a temperature region ranging from 100 degrees C. to 200 degrees C. as calculated based on temperature-programmed desorption of ammonia being in a range from 0.01 mmol/g to 10 mmol/g,
   wherein the aluminum compound is at least one selected from aluminum hydroxide and aluminum oxide, wherein a crystal structure of the aluminum hydroxide is pseudo-boehmite and a crystal structure of the aluminum oxide is at least one crystal structure selected from the group consisting of $\chi$ and $\rho$,
   wherein the adsorbent has an $NH_3$ desorption as calculated based on a temperature-programmed desorption of ammonia in a temperature region ranging from 100 degrees C. to 200 degrees C. in a range from more than 0.001 mmol/g to 1 mmol/g or less, and
   wherein the adsorbent comprises less than 1 mass % of a component containing a transition metal other than copper.

9. The method of manufacturing according to claim 8, wherein the aluminum compound is aluminum oxide having a crystal structure of $\chi$.

10. The method of manufacturing according to claim 8, wherein the adsorbent comprises less than 0.1 mass % of a component containing a transition metal other than copper.

* * * * *